April 20, 1971        K. E. B. PLAVEN        3,575,710

PROCESS OF SEPARATING GLUTEN FROM STARCH AND OTHER SOLIDS

Original Filed May 24, 1965

INVENTOR
KARL ERIK BERNHARD PLAVÉN

BY *Wendroth, Lind & Ponack*

ATTORNEYS

United States Patent Office 3,575,710
Patented Apr. 20, 1971

3,575,710
PROCESS OF SEPARATING GLUTEN FROM STARCH AND OTHER SOLIDS
Karl Erik Bernhard Plaven, Scheelegatan 1, Stockholm, Sweden
Original application May 24, 1965, Ser. No. 458,230. Divided and this application Nov. 6, 1968, Ser. No. 773,891
Claims priority, application Sweden, June 1, 1964, 6,638/64
Int. Cl. C13l 1/00
U.S. Cl. 127—67     1 Claim

ABSTRACT OF THE DISCLOSURE

A process for separating gluten from starch in a pretreated dough made from flour and water. A pump has an inlet and an outlet and a first pipe for leading the pretreated dough to the inlet. A screen connected to the outlet by a second pipe separates the gluten and water. A third pipe leads the water separated from the gluten from the screen and a fourth pipe leads the gluten separated from the screen. A perforated plate located between the outlet from said pump and the inlet to the screen is provided through which the gluten lumps are pressed by the aid of the water. A second series of elements as above is connected to the fourth pipe and additional series as desired similarly connected. Additional means are provided to supply water to the second pipes. The gluten when pressed through the respective passages is first given a shape of a thin-walled tube or blister which is then torn by the action of the liquid under pressure into thin threads or bands which after the gluten has left the passages again collect into lumps of a porous sponge-like structure, so that the gluten shall have large surfaces of contact with the water, which facilitates and accelerates removal of the starch granules.

---

This application is a division of my application Ser. No. 458.230, filed May 24, 1965, entitled "Processes of Separating Gluten From Starch and Other Solids and Apparatus Therefor."

This invention relates to a process of separating gluten from starch in a dough made out of flour and water, the separating procedure being a washing process in which the starch granules are separated by means of water from the gluten which is subjected to a kneading, piercing and/or cutting action in order to expose the starch granules to the water, possibly followed by dividing the gluten into lumps.

The prior-art methods permit obtaining a high-grade gluten either by a slow, non-continuous and thus costly treatment, or by a considerably quicker treatment which, however, may involve heavy gluten losses with the wash water, especially when wheat flours with weak gluten are employed, and as a consequence also more impurities in the starch fraction, thus making it necessary to incorporate additional equipment for the recovery of lost gluten. These drawbacks of the hitherto known methods are eliminated by the process according to the present invention, which comprises converting the gluten into a spongy shape in which the gluten still coheres in sufficiently large aggregates suitable for the following treatment but offers large surfaces in contact with the water, which facilitates and accelerates the extraction of the starch from the gluten.

For this purpose the apparatus suggested by the present invention for carrying out the process comprises perforated plates inserted for instance at the pump outlets, in the piping, or at the screen inlet, through which plates the gluten is pressed by the aid of the wash water passing through the treatment line.

Thus, the present invention makes it possible to separate gluten from starch in a continuous, quick and simple manner and still to obtain a high yield of gluten.

The invention is described below, reference being made to the accompanying drawings illustrating a suitable arrangement according to the invention.

In the drawings:

FIG. 4 is a schematic view of the apparatus assembled with a screen in the wheat starch and wheat gluten separating plant.

Figure 1:
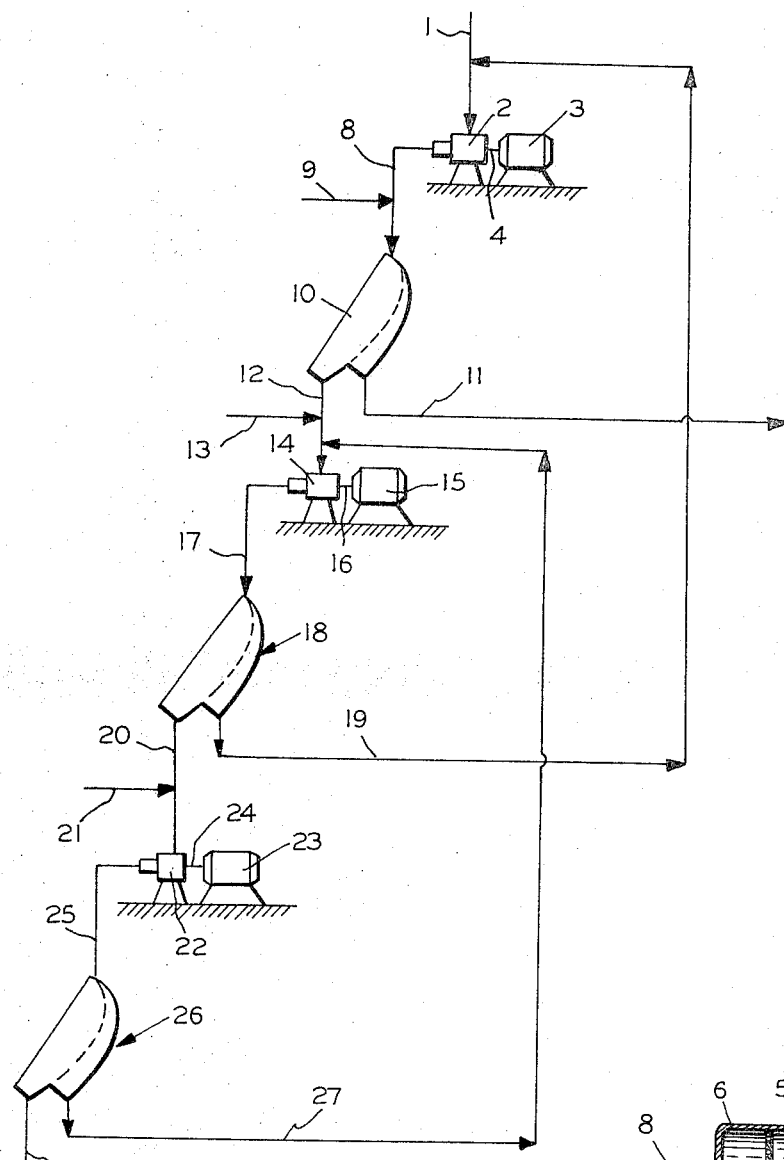
FIG. 1 is a schematic view of the end section of a plant for the separation of wheat starch and wheat gluten, the preceding sections being omitted.

Practically all wheat flour used for the production of wheat starch and wheat gluten has an ash content of less than 1.3%. When using a wheat flour with suitable gluten content and quality it is possible to obtain a gluten yield of practically 100%. Water is mixed with the flour at the weight ratio of about 40–80 parts of water to 100 parts of flour so as to obtain a plastic dough, which possibly after a certain set swelling time, is treated with water for washing out the starch from the dough. The dough which eventually consists of mainly gluten maintains its plastic but undivided, i.e. cohering, nature throughout the washing treatment. During the washing the dough is treated in contact with water, with or without water spraying, by kneading or other known action, so that also the interior is exposed to the water. The treatment mentioned above is the pretreatment, after which the dough is subjected to the treatment as shown in FIG. 1. After being prewashed and divided into smaller lumps the dough is thus transported through a pipe 1 ending in a pump 2 driven by means of a motor 3 via a shaft 4. At or after the outlet of the pump 2 there are two chambers 5 and 6, divided by a perforated plate 7 through which the gluten lumps are pressed by the aid of the water. The lumps are then discharged through a pipe 8. The only object of the pump 2 is to press water and the gluten lumps through the perforated plate 7. Its object is thus not to cut, pierce, or disintegrate the gluten lumps in order that the water may reach the imbedded starch granules. Water in this description may also mean water containing starch obtained in the last preceding stage and/or the following stages of the washing or starch refining process. When being pressed through the perforations of the plate 7 the gluten lumps are converted into a spongy or waste-cotton like shape, mainly without the formation of discrete very small gluten particles. The spongy lumps offer large surfaces exposed to the water, thus facilitating an efficient extraction of the starch granules owing to the water flow in the pipe 8 and other pipes described below. The term "spongy" in this description means any porous shape where water may reach the inner pores.

Figure 2:
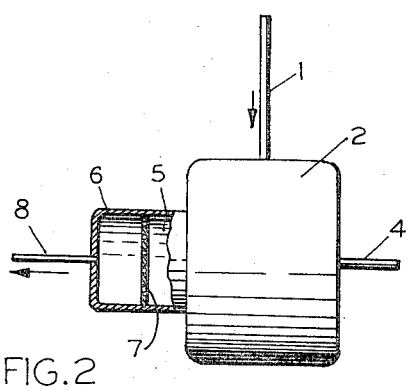
FIG. 2 is a schematic view of the apparatus according to the invention assembled with a pump in the wheat starch and wheat gluten separating plant.
Figure 3:
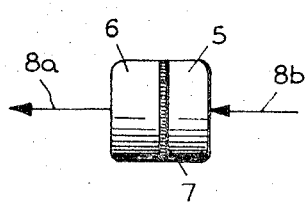
FIG. 3 is a schematic view of the apparatus connected in the treatment line.

Through the pipe 8, to which another pipe 9 may be connected for the addition of extra water, the spongy lumps are transported to a screen 10 where gluten and water are separated. The water is discharged through a pipe 11 and added to the prewashing section at a suitable point thereof. Together with a minor amount of water not separated off by the screen 10 the gluten is discharged through a pipe 12 to which pure water or water from a following stage may be added through a pipe 13. A pump 14 of the same kind as that shown in FIG. 2, i.e. with chambers and perforated plate, driven by a motor 15 via a shaft 16 presses the water and gluten through the perforations of the plate, further converting the gluten into a spongy shape and transporting the slurry through a pipe 17 to another screen 18, where the major part of the water is separated from the gluten.

The water is discharged through a pipe 19 and is added to the pipe 1 at a suitable point. The gluten together with remaining water is discharged through a pipe 20 to which a pipe 21 for water is connected. The pipe 20 is connected to a pump 22, driven by a motor 23, via a shaft 24. The pump 22, which is of the same kind as the pump 2 shown in FIG. 2, presses the gluten and the water through another perforated plate, thereby further converting the gluten into a spongy shape, and through a pipe 25 to a screen 26. From this screen the water is discharged through a pipe 27 to a suitable point in the pipe 12. When leaving the screen 26, through the pipe 28, the gluten contains very little starch, but if desired it can be treated in further washing stages incorporating pumps, pipes, perforated plates, and screens as described above.

Because the water separated off in one stage is added to a preceding stage, small gluten particles possibly carried by the water are returned to the process and agglomerates with the larger gluten lumps. Hereby practically no gluten is lost. Furthermore, it has been possible to carry out the washing in a rapid and fully automatic manner, labor being necessary for supervision only.

The holes of the perforated plates, e.g. the plate 7, are of a size such that the spongy gluten pressed through the holes has a dimension in its shortest extension of 2 mm. or more. In order that the spongy gluten lumps may get an increased surface exposed to the water, the perforations of the plates may be shaped like e.g. the holes of a grater. As the sharp edges of the holes are mainly in line with the direction of flow of gluten, they have not the disintegrating effect as in a grater but rather a fraying effect. The perforations may, however, be of any shape whatever.

At the screening the wash liquid with the starch taken up by said liquid is separated from the lumps of gluten which remain on the screen plate while the wash liquid flows through said plate. This clearly indicates the difference between the screening procedure and the active working of the gluten which takes place in the process of the invention. The invention involves a treatment in which both the wash liquid and the gluten lumps are pressed through perforate plates. The treatment is a combination of mechanical treatment and a hydraulic pressure treatment in which quite unexpectedly the gluten when passing through the respective holes of the perforate plate will be in a manner of speaking adhere to or be arrested by the hole edges with the portions adjoining said edges while the portions of the gluten at the centers of said holes will be pressed more rapidly through the holes so that in a first stage the gluten will be caused to take a tubular or blister-like shape. In a second stage the thin wall of the gluten cannot withstand the pressure of the wash liquid but is torn into thin bands or threads which have large surfaces of contact with the wash liquid. Because of the high tendency of the gluten of again adhering together the bands or threads collect into lumps of a porous sponge-like structure. In all these stages of thin-walled tubular lengths or blisters, or of bands or threads, or finally of porous sponge-like lumps the gluten will have large surfaces of contact with the surrounding water so that the starch granules are rapidly washed out. It has proved in practice that the invention washes out the starch granules at a substantially higher rate than that possible to attain hitherto.

The principle of the invention is not confined only to what is described above, but may be embodied in various forms within the scope of the claim as outlined below.

I claim:

1. A process of separating gluten from starch in which the separation is a washing procedure with water as the wash liquid wherein the lumps of gluten are worked to uncover starch granules embedded in the gluten and to make the granules easily accessible for the water and the starch granules are screened off and renewed in an optionally repeated cycle comprising pressing the gluten lumps with the aid of the moving wash liquid and together with said liquid through narrow passages, subjecting said lumps to a hydraulic pressure treatment by means of the wash liquid under pressure, said gluten when pressed through the respective passages being first given a shape of a thin-walled tube which is then torn by the action of the liquid under pressure into thin threads which after the gluten has left the passages again collect into lumps of a porous sponge-like structure whereby the gluten has large surfaces of contact with the water facilitating and accelerating removal of the starch granules.

References Cited

R. A. Anderson et al.: Cereal Chem., 35, 449–457 (1958).

R. A. Anderson et al.: Cereal Chem., 37, 180–188 (1960).

MORRIS O. WOLK, Primary Examiner

S. MARANTZ, Assistant Examiner